United States Patent
Kim

(10) Patent No.: US 9,917,653 B2
(45) Date of Patent: Mar. 13, 2018

(54) MOBILE TERMINAL AND CONTROLLING METHOD THEREOF

(71) Applicant: LG ELECTRONICS INC., Seoul (KR)

(72) Inventor: Changmok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/326,459

(22) PCT Filed: Jun. 9, 2015

(86) PCT No.: PCT/KR2015/005772
§ 371 (c)(1),
(2) Date: Jan. 13, 2017

(87) PCT Pub. No.: WO2016/010262
PCT Pub. Date: Jan. 21, 2016

(65) Prior Publication Data
US 2017/0207859 A1   Jul. 20, 2017

(30) Foreign Application Priority Data
Jul. 15, 2014 (KR) ........................ 10-2014-0089341

(51) Int. Cl.
*H04B 11/00* (2006.01)
*H04W 12/06* (2009.01)
(Continued)

(52) U.S. Cl.
CPC ......... *H04B 11/00* (2013.01); *G06F 3/04883* (2013.01); *H04L 5/0055* (2013.01);
(Continued)

(58) Field of Classification Search
CPC ..... H04B 11/00; H04B 1/00; H04M 1/72519; H04M 2250/22
See application file for complete search history.

(56) References Cited

U.S. PATENT DOCUMENTS 8,854,985 B2 * 10/2014 Tsfaty .................... H04B 11/00
370/247
2011/0037712 A1 * 2/2011 Kim .................... H04M 1/7253
345/173
(Continued)

FOREIGN PATENT DOCUMENTS

| KR | 1020090066102 | 6/2009 |
| KR | 1020120024065 | 3/2012 |
| KR | 1020140051716 | 5/2014 |

OTHER PUBLICATIONS

PCT International Application No. PCT/KR2015/005772, Written Opinion of the International Searching Authority dated Sep. 30, 2015, 9 pages.

*Primary Examiner* — Sonny Trinh
(74) *Attorney, Agent, or Firm* — Lee, Hong, Degerman, Kang & Waimey

(57) ABSTRACT

A mobile terminal and controlling method thereof are disclosed, by which a communication can be performed using a sound wave or an ultrasonic wave. The present invention includes a display unit configured to display information, a microphone configured to receive an input of a sound, and a controller, if a preset user input is received, controlling the microphone to enter a state capable of listening to a communication signal on at least one band of a sound wave and an ultrasonic wave.

16 Claims, 10 Drawing Sheets

(51) Int. Cl.
*H04W 8/00* (2009.01)
*H04W 48/20* (2009.01)
*H04W 76/02* (2009.01)
*H04M 1/725* (2006.01)
*H04L 5/00* (2006.01)
*G06F 3/0488* (2013.01)

(52) U.S. Cl.
CPC ....... *H04M 1/72519* (2013.01); *H04W 8/005* (2013.01); *H04W 12/06* (2013.01); *H04W 48/20* (2013.01); *H04W 76/023* (2013.01); *G06F 2203/04808* (2013.01); *H04M 2250/22* (2013.01)

(56) References Cited

U.S. PATENT DOCUMENTS

| | | | | |
|---|---|---|---|---|
| 2011/0300845 A1* | 12/2011 | Lee | .......................... | H04M 1/67 455/418 |
| 2015/0119067 A1* | 4/2015 | Lavery | ................ | H04W 64/003 455/456.1 |
| 2015/0207924 A1* | 7/2015 | Kim | .................. | H04M 1/72583 455/414.1 |

* cited by examiner

[Fig. 1A]
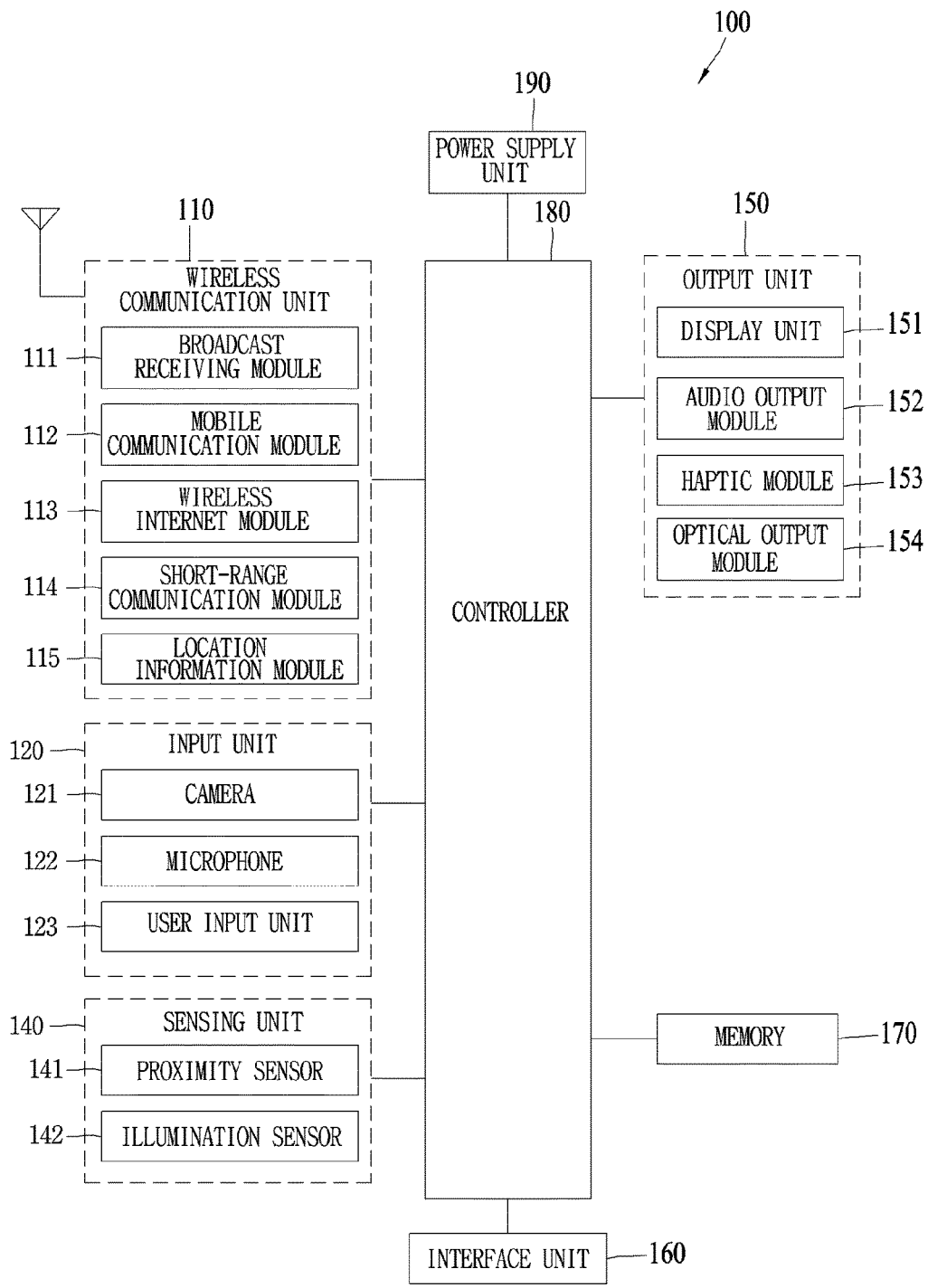

[Fig. 1B]
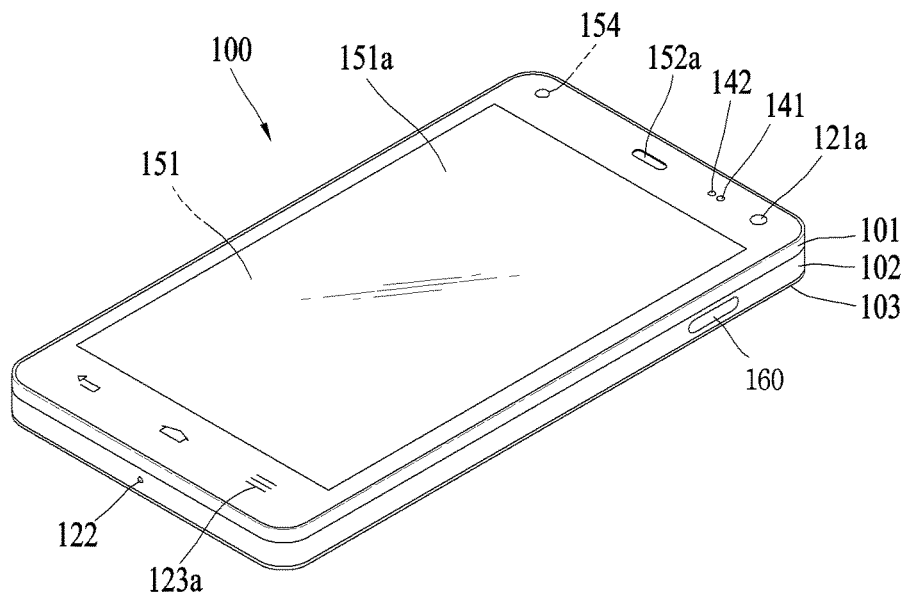
[Fig. 1C]
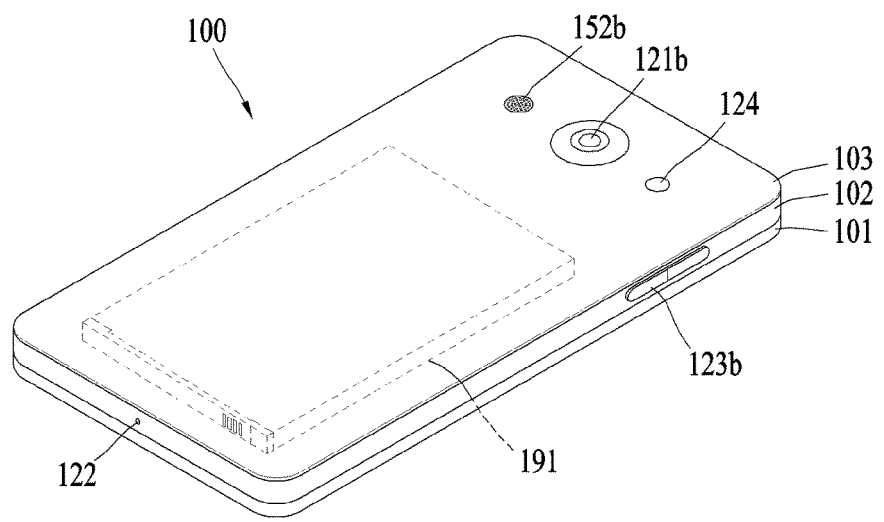

[Fig. 2A]
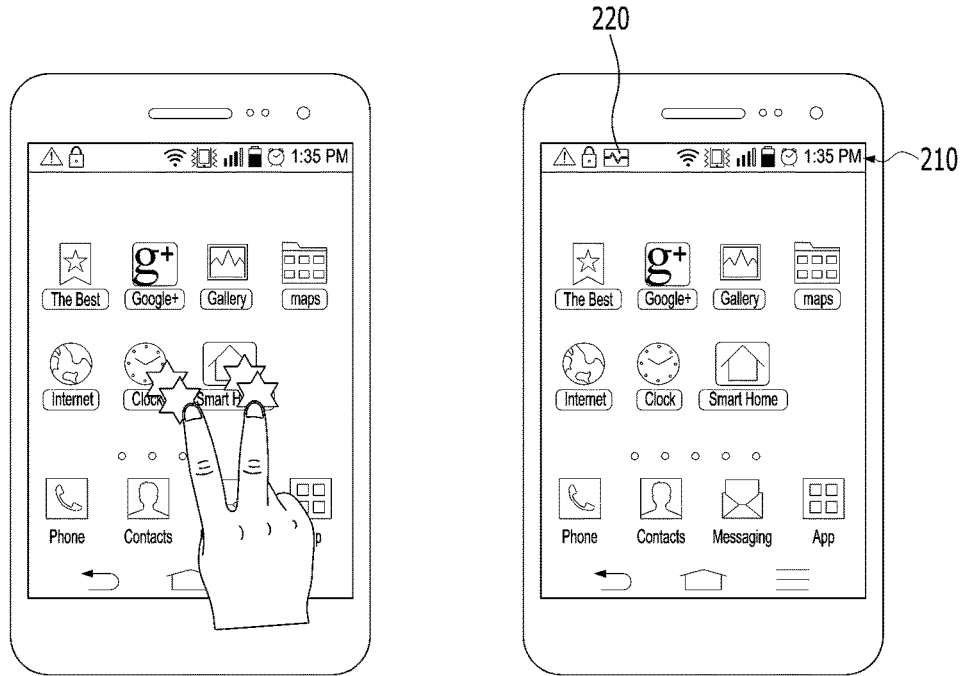
<Touch a display unit twice with two pointers>
(a)
<Enter a communication mode>
(b)
[Fig. 2B]
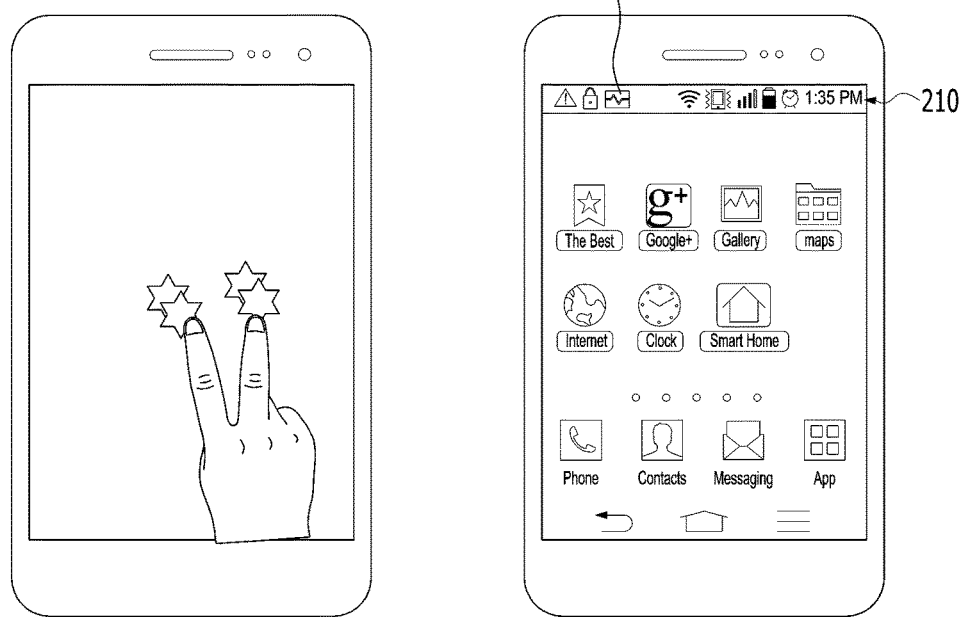
<When a display is in off-state, touch a display unit twice with two pointers>
(a)
<Enter a communication mode by turning on a display unit>
(b)

[Fig. 2C]
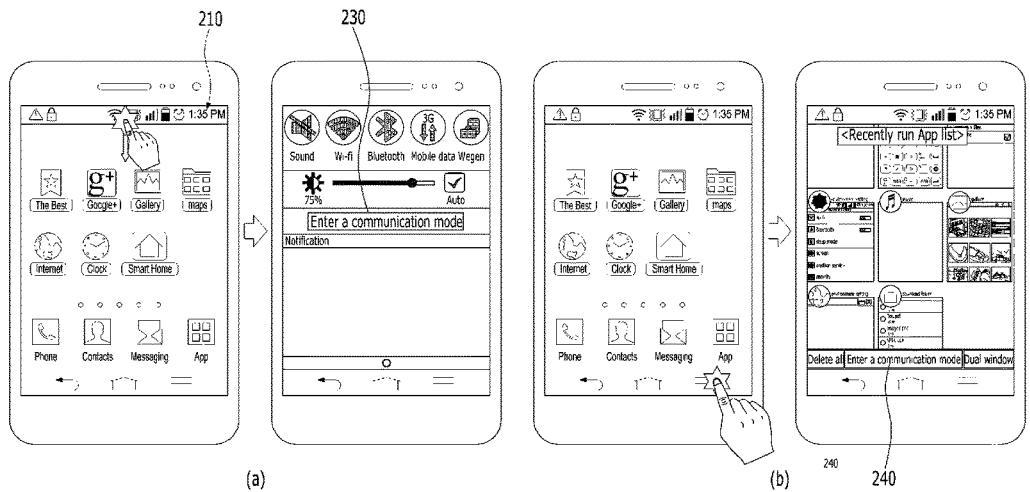
[Fig. 3]
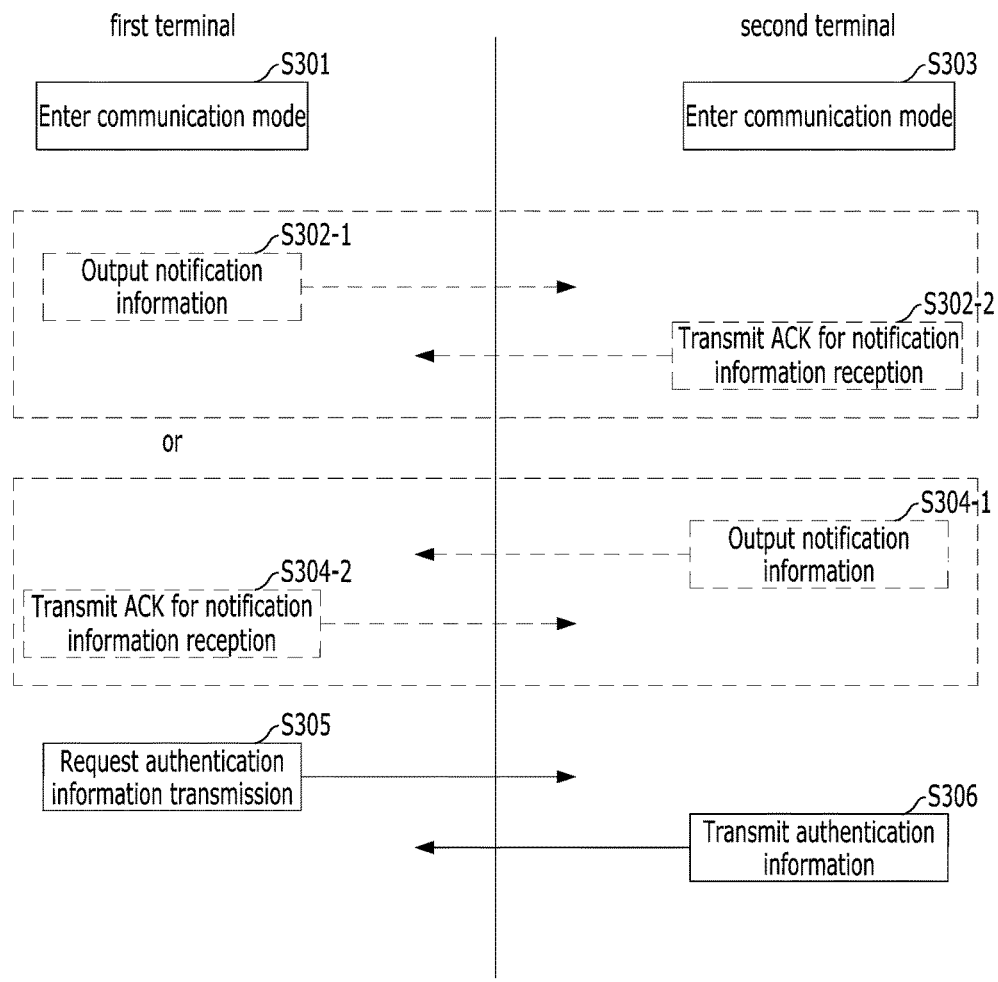

[Fig. 4]
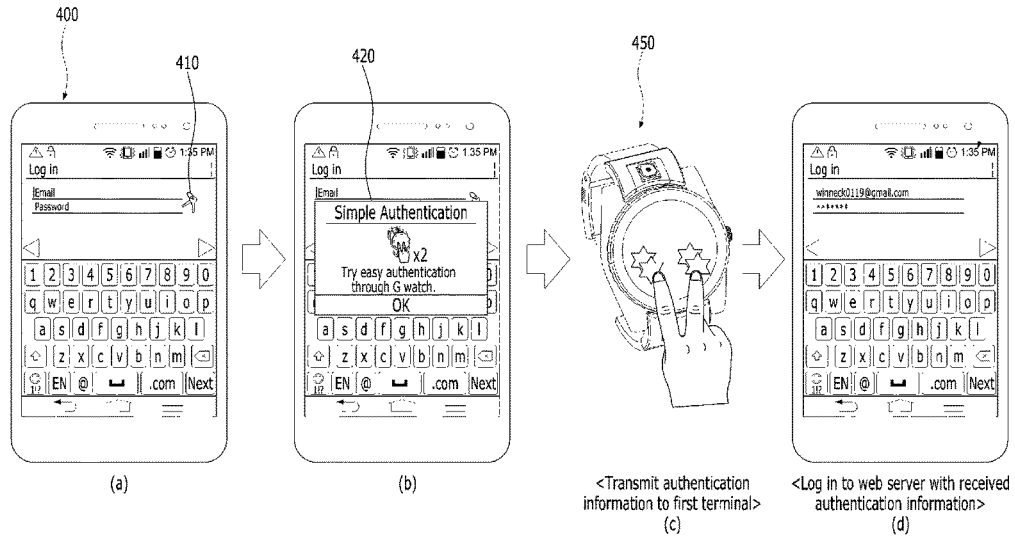
[Fig. 5]
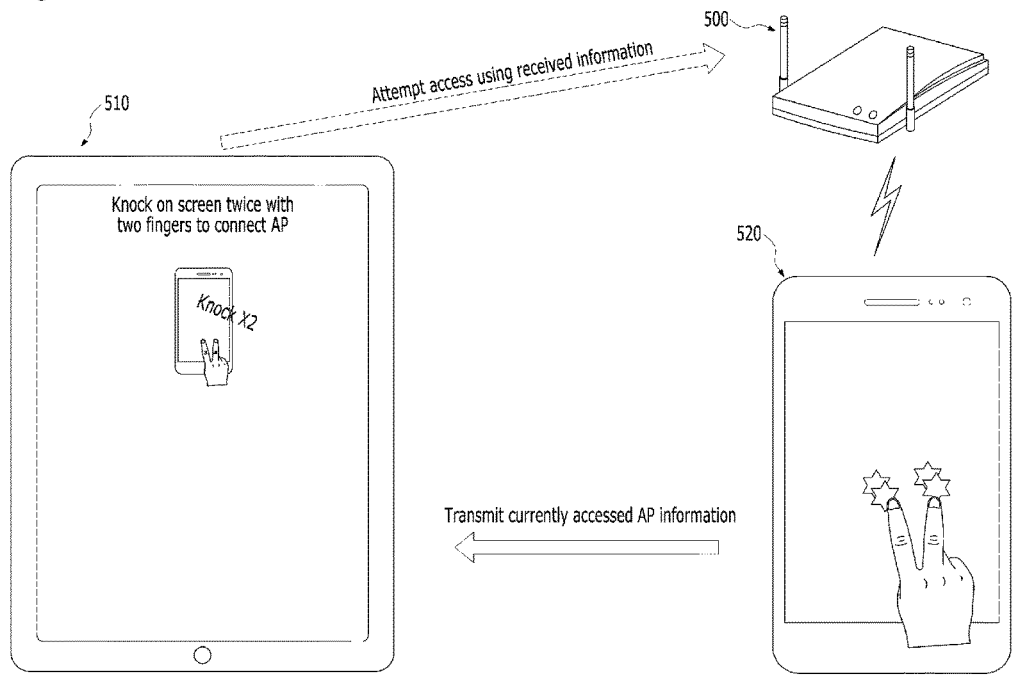

[Fig. 6]
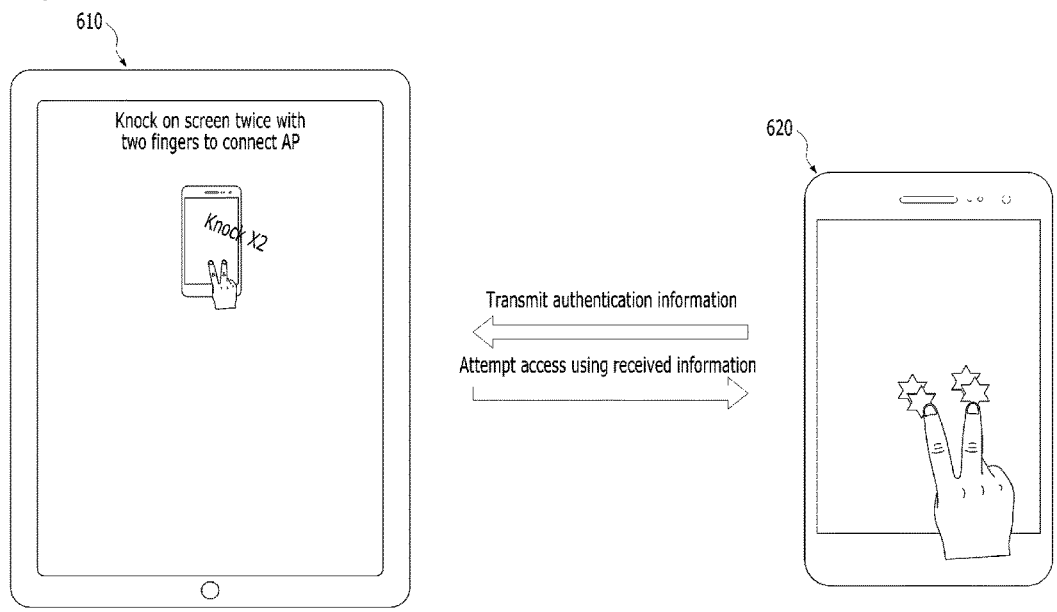
[Fig. 7]
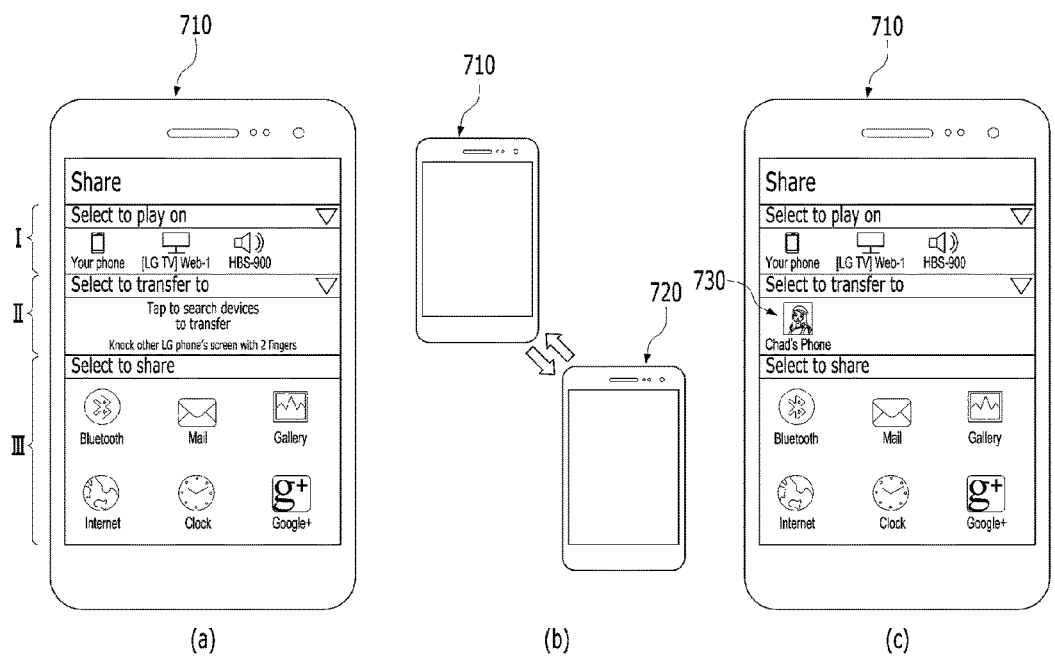

[Fig. 8]
Beacon frame broadcast
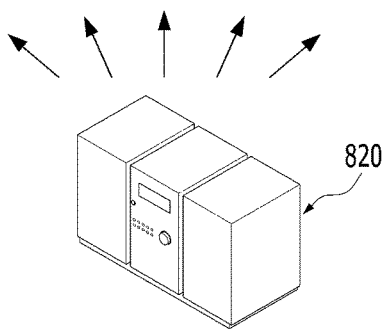
SSID : AUDIO-WIFI
Beacon frame broadcast
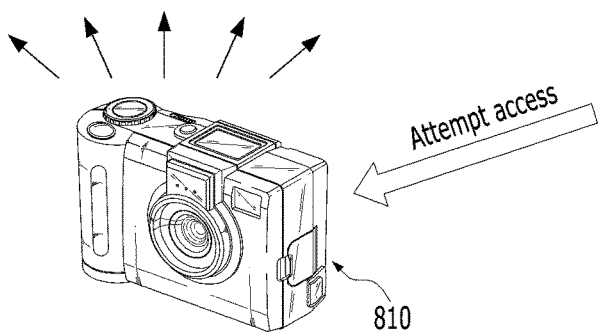
SSID : CAMERA-WIFI
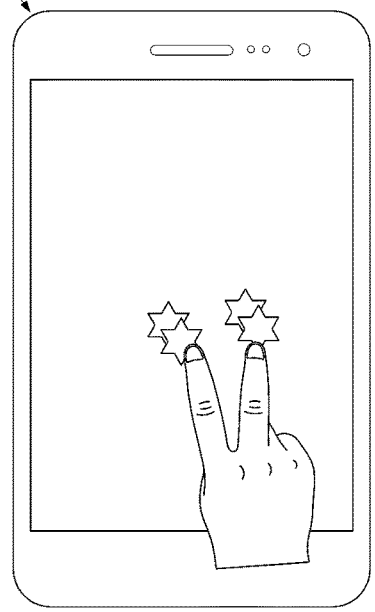
Attempt access to SSID including text string (CAMERA' by turning on Wi-Fi)

[Fig. 9]
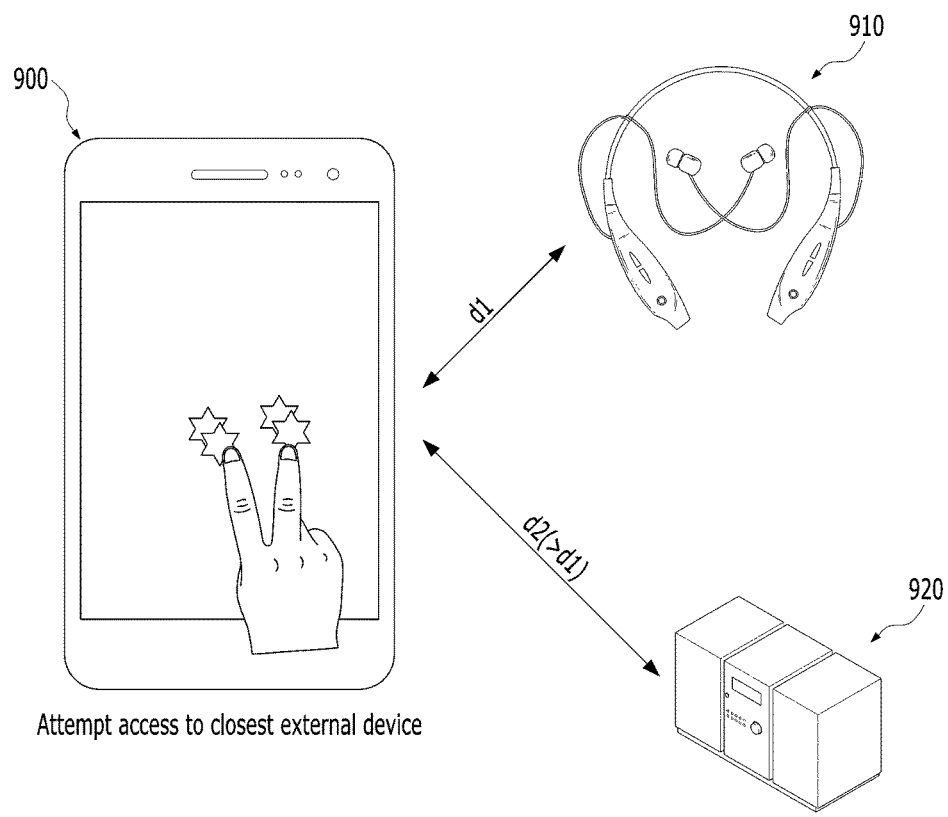
Attempt access to closest external device
[Fig. 10]
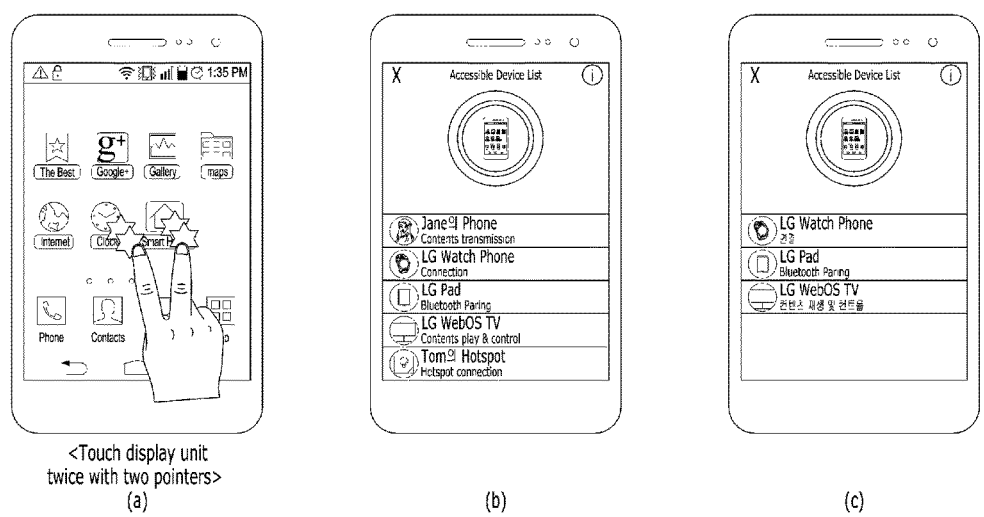
<Touch display unit
twice with two pointers>
(a)     (b)     (c)

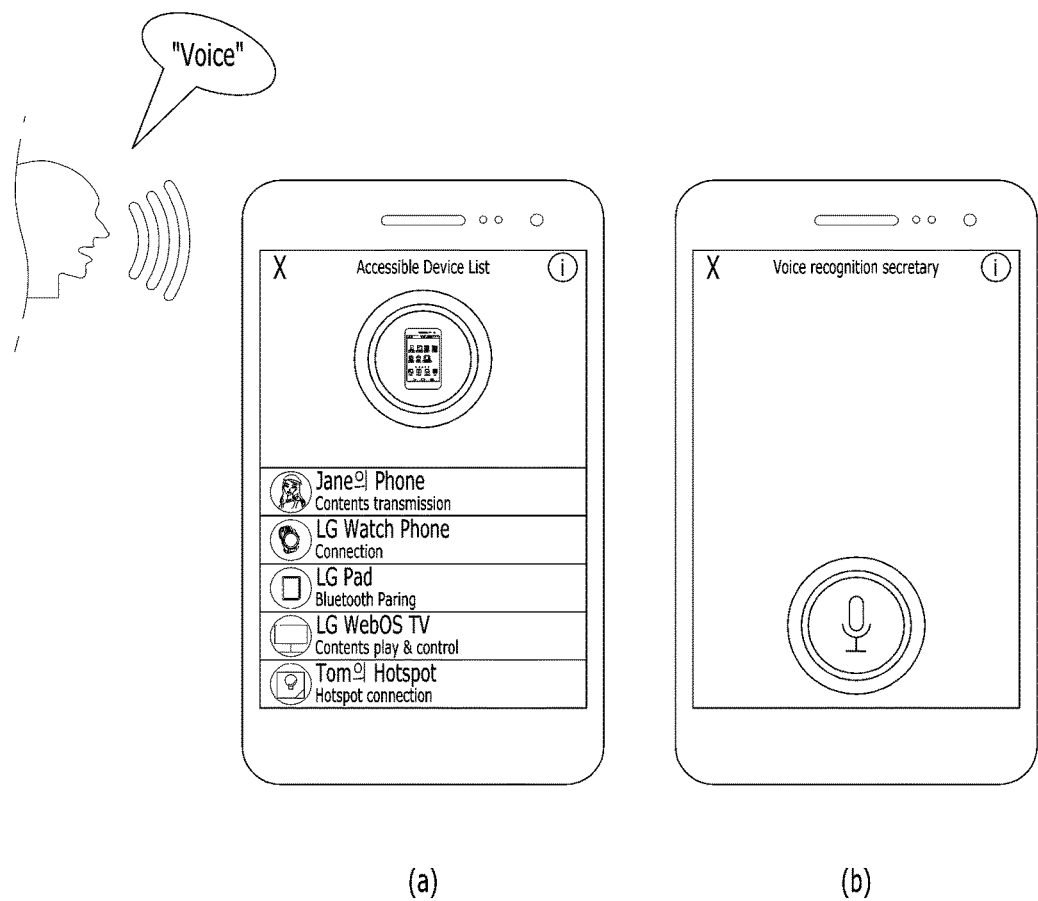

[Fig. 12]
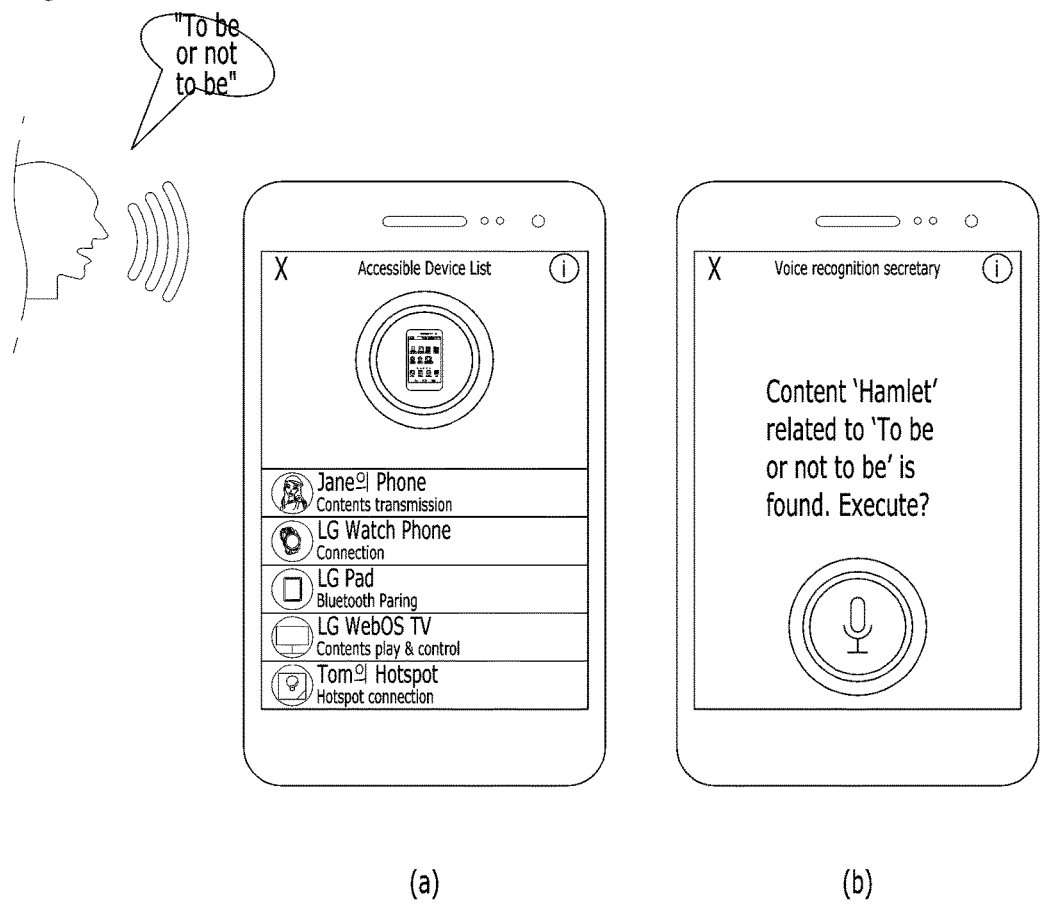

MOBILE TERMINAL AND CONTROLLING METHOD THEREOF

CROSS-REFERENCE TO RELATED APPLICATIONS

This application is the National Stage filing under 35 U.S.C. 371 of International Application No. PCT/KR2015/005772, filed on Jun. 9, 2015, which claims the benefit of earlier filing date and right of priority to Korean Application No. 10-2014-0089341, filed on Jul. 15, 2014, the contents of which are all hereby incorporated by reference herein in their entirety.

TECHNICAL FIELD

The present invention relates to a mobile terminal, and more particularly, to a mobile terminal and controlling method thereof. Although the present invention is suitable for a wide scope of applications, it is particularly suitable for performing a communication using a sound wave or an ultrasonic wave.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs. As functions of the terminal are getting diversified, the terminal tends to be implemented as a multimedia player provided with complex functions such as photographing of photos or videos, playback of music or video files, game play, broadcast reception and the like for example.

For a wireless communication through a mobile communication network, chips for LTE, WCDMA and the like are inserted in a mobile terminal. In particular, various wireless communication chips including a Wi-Fi chip for a Wi-Fi communication, a Bluetooth chip for a Bluetooth communication, an NFC chip for an NFC communication and the like are inserted in a mobile terminal.

A user can perform a communication with a different terminal by selecting one of various communication technologies applied to a mobile terminal. To this end, it is forced to turn on a wireless communication chip intended to be used for the communication with the different terminal. If the wireless communication chip keeps being turned on all the time, it is not preferable in aspect of power consumption. While the communication chip is normally turned off, if it is intended to perform a communication with the different terminal, the wireless communication can be preferably turned on. However, each time a user intends to perform a communication with a different terminal, if a user interface for turning on a wireless communication chip is called in, it may consume an additional time and cause inconvenience to the user.

Therefore, the present invention intends to disclose a mobile terminal capable of communicating with a different terminal without using a communication chip and a mobile terminal capable of establishing a wireless communication with a different terminal promptly through an information carried on a sound wave or an ultrasonic wave.

DISCLOSURE OF INVENTION

Technical Problem

Accordingly, the present invention is directed to a mobile terminal and controlling method thereof that substantially obviate one or more of the problems due to limitations and disadvantages of the related art.

One object of the present invention is to provide a mobile terminal and controlling method thereof, by which a communication signal can be transceived on a sound wave or an ultrasonic wave.

Technical tasks obtainable from the present invention are non-limited by the above-mentioned technical tasks. And, other unmentioned technical tasks can be clearly understood from the following description by those having ordinary skill in the technical field to which the present invention pertains.

Solution to Problem

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a mobile terminal according to the present invention includes a display unit configured to display information, a microphone configured to receive an input of a sound, and a controller, if a preset user input is received, controlling the microphone to enter a state capable of listening to a communication signal on at least one band of a sound wave and an ultrasonic wave.

To further achieve these and other advantages and in accordance with the purpose of the present invention, as embodied and broadly described, a method of controlling a mobile terminal according to the present invention includes the steps of receiving an input of a preset user input and setting a microphone to enter a state capable of listening to a communication signal on at least one band of a sound wave and an ultrasonic wave.

Technical tasks obtainable from the present invention are non-limited by the above-mentioned technical tasks. And, other unmentioned technical tasks can be clearly understood from the following description by those having ordinary skill in the technical field to which the present invention pertains. It is to be understood that both the foregoing general description and the following detailed description are exemplary and explanatory and are intended to provide further explanation of the invention as claimed.

Advantageous Effects of Invention

Accordingly, a mobile terminal and controlling method thereof according to the present invention provide the following effects and/or features.

First of all, according to one embodiment of the present invention, user s convenience can be enhanced.

Secondly, according to one embodiment of the present invention, a communication signal can be transceived on a sound wave or an ultrasonic wave.

Effects obtainable from the present invention may be non-limited by the above mentioned effect. And, other unmentioned effects can be clearly understood from the following description by those having ordinary skill in the technical field to which the present invention pertains.

BRIEF DESCRIPTION OF DRAWINGS

The present invention will become more fully understood from the detailed description given herein below and the accompanying drawings, which are given by ilillustration only, and thus are not limitative of the present invention, and wherein:

FIG. 1A is a block diagram of a mobile terminal in accordance with the present disclosure;

FIGS. 1B and 1C are conceptual views of one example of the mobile terminal, viewed from different directions;

FIGS. 2A to 2C are diagrams for examples of setting a mode of a mobile terminal to a communication mode in response to a preset user input;

FIG. 3 is a flowchart for operations of a first terminal and a second terminal according to one embodiment of the present invention;

FIG. 4 is a diagram of one example for a first terminal to receive a login information for accessing a web server from a second terminal;

FIG. 5 is a diagram of one example for a first terminal to receive an authentication information for accessing an AP from a second terminal;

FIG. 6 is a diagram of one example for a first terminal to receive an authentication information for accessing a second terminal;

FIG. 7 is a diagram of one example for a first terminal to obtain an identification information of a second terminal from the second terminal;

FIG. 8 is a diagram for one example of attempting an access to a preset external terminal if a communication module of a mobile terminal is turned on;

FIG. 9 is a diagram for one example of attempting an access to an external terminal closest to a mobile terminal if a communication module of the mobile terminal is turned on;

FIG. 10 is a diagram for one example of outputting a device list of accessible devices found by each of a plurality of communication modules if a plurality of the communication modules are turned on;

FIG. 11 is a diagram for one example of running a prescribed application through a voice inputted in the course of outputting a device list; and FIG. 12 is a diagram for one example of outputting a search result of a content corresponding to an inputted voice.

MODE FOR THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being 'connected with' another element, the element can be connected with the other element or intervening elements may also be present. In contrast, when an element is referred to as being 'directly connected with' another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO(Enhanced Voice-Data Optimized or Enhanced Voice-Data Only), Wideband CDMA (WCDMA), High Speed Downlink Packet access (HSDPA), HSUPA(High Speed Uplink Packet Access), Long Term Evolution (LTE), LTE-A(Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA(High Speed Uplink Packet Access), Long Term Evolution (LTE), LTE-A(Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB(Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact.

The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device" may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a unibody is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera". When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

For clarity of the description, assume that a mobile terminal according to the present invention includes at least one of the components shown in FIGS. 1A to 1C. For instance, the mobile terminal according to the present invention may be assumed as including the wireless communication unit 110, the microphone 121, the display unit 151, the audio output unit 152, the memory 170, the controller 180, and the like.

According to the foregoing description with reference to FIG. 1A, it is assumed that the wireless communication technologies including Wi-Fi, Bluetooth, NFC and the like can apply to the wireless communication unit 110. For clarity of the following description, the wireless communication unit 110 shall be subdivided and named by the wireless communication technology unit. Hence, a configuration for performing the Wi-Fi communication shall be named a Wi-Fi module, while a configuration for performing the Bluetooth communication shall be named a Bluetooth module.

If the display unit 151 includes a touchscreen, since implementations of the embodiments mentioned in the following description can be further facilitated, the display unit 151 shall be assumed as including the touchscreen in the following description. Besides, although the display unit 151 fails to include the touchscreen, it is a matter of course that the embodiments mentioned in the following description can apply to the mobile terminal. In this case, a touch input applied to the touchscreen may be substituted with one of various user inputs (e.g., a button push, a user voice input, a user gesture input, etc.).

Generally, a mobile terminal performs a communication with a different terminal using various communication technologies mentioned in the foregoing description with reference to FIG. 1A. Recently, short range communications such as Wi-Fi Direct, Bluetooth, NFC and the like are mainly used for device-to-device communications. Yet, in case of attempting to perform the device-to-device communications using the above-listed short range communications, it causes a problem that various kinds of user manipulations are required.

For instance, in case that a mobile terminal attempts to perform a communication with a different terminal using Bluetooth (BLE (Bluetooth Low Energy) included), a user preferentially activates Bluetooth module in order to enable the Bluetooth module to search for a different terminal supportive of Bluetooth communication. Once the terminal supportive of the Bluetooth communication is found, the user should select a device to pair with the mobile terminal from a list of the found devices. If a PIN (personal identification number) for the pairing with the selected device is set already, the user should perform a step of inputting the PIN.

Thus, in order to perform a short range communication with a different terminal by an existing communication technology, user inputs such as an activation of a corresponding communication module, a selection of a terminal to be connected from a device list, an input of a PIN for a connection and the like are requested. If a plurality of steps of user inputs are requested for the connection to the different terminal, inconvenience is caused to a user of the short range communication to lower a use rate of the short range communication.

In order to solve the above-mentioned problem, proposed in the following is a mobile terminal capable of quickly performing a short range communication with a different terminal through a sound wave or an ultrasonic wave. In this case, a range of the sound wave or the ultrasonic wave may be limited to a band available for inputs/outputs of the speaker and the microphone 121.

The mobile terminal according to the present invention can perform a communication with a different terminal using a sound wave or an ultrasonic wave. In case of attempting to perform a communication with a different terminal using a sound wave or an ultrasonic wave, the audio output unit 152 (e.g., a speaker, etc.) may be utilized as a transmitter of signals and the microphone 121 may be utilized as a receiver. For instance, on a heptatonic scale, a sound 'C (i.e., do)' is assumed as set to a signal 'low (i.e., 0)' and a sound 'G (i.e., sol)' is assumed as set to a signal 'high'. On these assumptions, the mobile terminal outputs the sounds C and G through the speaker so as to transmit data to the different terminal. On these assumptions, the mobile terminal extracts frequencies corresponding to the sounds C and G from a sound inputted through the microphone 121 so as to receive data from the different terminal. In particular, the speaker is utilized as a transmitter for a data transmission, while the microphone 121 is utilized as a receiver for a data reception. Thus, the mobile terminal according to the present invention can perform a data communication with a different terminal using a sound wave and an ultrasonic wave within a microphone audible band. For clarity of the descriptions of the following embodiments, signals of the sound and ultrasonic wave bands, which are inputted and outputted through the microphone 121 and the speaker, shall be named sound signals.

Through the sound signals on the sound and ultrasonic wave bands, a contact information, an information for a connection of a device-to-device wireless communication (e.g., Bluetooth, Wi-Fi Direct, etc.), an information currently displayed by a terminal, an information extractable from a currently run application, a user-designated information and the like can be carried. Using the informations for the wireless communication connection, which are carried on the sound signals, a connection of the mobile terminal may be facilitated using a bearer on a high frequency band (e.g., Bluetooth on 2.45 GHz band, Wi-Fi Direct on 2.4~5 GHz band, etc.).

Since the speaker and the microphone 121 are utilized as the transmitter and the receiver, respectively, it is advantageous in that a terminal-to-terminal communication can be achieved without a separate wireless communication chipset. And, it is also advantageous in that communication compatibility for all terminals equipped with microphones and speakers can be secured.

Besides, the speaker and the microphone 121 can be utilized for various purposes such as an output of audio data during a multimedia file playback, an audio recording and the like as well as for the transmission of information using a sound wave or an ultrasonic wave.

The mobile terminal 100 of the present invention may deliver a communication signal through a frequency band (i.e., a frequency band except an audible frequency) not overlapping with a frequency band for audio data output and voice recording. Yet, the mobile terminal 100 of the present invention can deliver a communication signal within the frequency band for the audio data output and the voice recording. Hence, the mobile terminal 100 according to the present invention needs to determine whether to use the speaker and the microphone 121 for a data communication or for a simple music input/output.

To this end, if a preset user input is inputted, the mobile terminal according to the present invention can control a communication mode to be entered. The communication mode mentioned in the description of the present invention means a state that the speaker and the microphone 121 are set to be used for the data communication. In the communication mode, the mobile terminal can listen to a sound signal through the microphone 121 or can output a sound signal through the speaker.

FIGS. 2A to 2C are diagrams for examples of setting a mode of a mobile terminal to a communication mode in response to a preset user input. For clarity of the following description, the preset user input is assumed as tapping the display unit 151 twice using two pointers.

Referring to FIG. 2A (a), if a user input of tapping the display unit 151 twice using two pointers is received, the controller 180 can set a mode of the mobile terminal to a communication mode. If the microphone 121 is in a deactivated state before entering the communication mode, the controller 180 may activate the microphone 121 to listen to a sound signal through microphone 121.

The controller 180 may control an indicator 220, which indicates that the mobile terminal has entered the communication mode, to be outputted through the display unit 151. According to the example shown in FIG. 2A (b), the indicator 220 is outputted through a status bar 210 for displaying operational statues of the mobile terminal.

After the mobile terminal has entered the communication mode, if a preset user input (e.g., an input of tapping the display unit 151 twice using two pointers) is applied or a sound signal is not inputted through the microphone 121 for a prescribed duration, the controller 180 can control the communication mode to be ended. When the communication mode is ended, the controller 180 may deactivate the microphone 121.

In FIG. 2A, a state that the display unit 151 is turned on is assumed. Like the example shown in FIG. 2B (a), while the display unit 151 is turned off (e.g., as the mobile terminal is operating in power-saving mode, the display unit 151 is turned off), even if a preset user input is received, the controller 180 can control the mobile terminal to enter the communication mode. Like the example shown in FIG. 2B (b), the controller 180 can control an indicator 220, which indicates that the mobile terminal has entered the communication mode, to be displayed by turning on the display unit 151 as soon as setting the mode of the mobile terminal to the communication node. Alternatively, by controlling the display unit 151 to maintain the off-state, the controller 180 may indicate that the mobile terminal has entered the communication mode through sound, vibration, light (e.g., LED ON & OFF) and/or the like.

Depending on a type of a user input applied in the off-state of the display unit 151, the controller 180 may turn on the display unit 151 without entering the communication mode or may turn on the display unit 151 as soon as entering the communication mode. For instance, if a user input of tapping the display unit 151 twice using a single pointer is received, the controller 180 simply turns on the display unit 151. For another instance, if a user input of tapping the display unit 151 twice using two pointers is received, like the example shown in FIG. 2B, the controller 180 turns on the display unit 151 and is also able to control the mobile terminal to enter the communication mode.

On the other hand while the display unit 151 is in the on-state, if a user input of tapping the display unit 151 twice using a single pointer is received, the controller 180 simply turns off the display unit 151. Yet, if a user input of tapping the display unit 151 twice using two pointers is received, like the example shown in FIG. 2A, the controller 180 maintains the on-state of the display unit 151 and is also able to control the mobile terminal to enter the communication mode.

According to the examples shown in FIG. 2A and FIG. 2B, the user input includes the input of tapping the display unit 151 twice using two pointers, by which a user input for entering the communication mode is non-limited. A touch input different from that shown in the drawing may be set as a user input for entering a communication mode. A voice or a gesture of shaking a mobile terminal can be set as a user input for entering a communication mode. Furthermore, a user input for entering a communication mode may include an input of pushing an externally exposed button of the mobile terminal or an input of touching a button outputted through the display unit 151.

For instance, FIG. 2C shows one example of entering a communication mode by touching a button outputted through the display unit 151.

Referring to FIG. 2C, if a user input of dragging a pointer currently touching a status bar 210 for displaying an operating status of the mobile terminal in a prescribed direction (e.g., a bottom direction of the display unit 151) is received, like the example shown in FIG. 2C (a), the controller 180 can output a button 230 for determining whether to set a mode of the mobile terminal to a communication mode. If the outputted button 230 is touched, the controller 180 can control the mobile terminal to enter the communication mode.

For another example, if a user input for requesting to display a list of recently used applications is received (e.g., if a navigation button for requesting a list of recently used applications is touched on the display unit 151), like the example shown in FIG. 2C (b), the controller 180 can output a button 240 for determining whether to set a mode of the mobile terminal to a communication mode as well as the recently used application list. If the outputted button 240 is touched, the controller 180 can control the mobile terminal to enter the communication mode.

The example of outputting the button for entering the communication mode is illustrated in FIG. 2C for clarity of the description only, by which the present invention is non-limited. Moreover, a button for entering a communication mode through a widget displayed on a home screen may be provided. Furthermore, buttons for entering a communication mode by other user inputs may be provided.

Based on the foregoing description, various embodiments applicable to a mobile terminal according to the present invention shall be described in detail as follows.

First of all, a mobile terminal according to the present invention transmits an authentication information to a different terminal through a sound signal or receives an authentication information from the different terminal through a sound signal, thereby performing an authentication using the transmitted or received authentication information. For clarity of the description, a terminal making a request for an authentication information shall be named a first terminal, while a terminal transmitting the authentication information in response to the request for the authentication information shall be named a second terminal.

FIG. 3 is a flowchart for operations of a first terminal and a second terminal according to one embodiment of the present invention.

First of all, assume that a first terminal is in the state that requires an authentication information for an access to a different terminal. For example of a case that the authentication information is required, there is a case that the first terminal attempts to log in to a web server. In this case, the first terminal may need such authentication information as an ID (identification), a password and the like to be authenticated by the web server. For another example, in case that the first terminal attempts a Wi-Fi connection to an AP (access point) or a second terminal set as a hotspot, the authentication information may be required. In this case, the first terminal may need such authentication information as an SSID (service set identifier) of the AP (or the second terminal set as the hotspot), a password for an access to the AP (or the second terminal set as the hotspot) and the like to be authenticated by the AP. Moreover, if the first terminal attempts a Bluetooth connection to the second terminal, authentication information may be required. In this case, in order to be authenticated by the second terminal, the first terminal may need such authentication information as a name of the second terminal, a password for a pairing with the second terminal and the like.

Besides, in various cases, there may occur a situation that the first terminal needs the authentication information as well as in the above-mentioned cases.

Referring to FIG. 3, if a user input of attempting to enable a first terminal, which needs an authentication information, to enter a communication mode is received, the first terminal enters the communication mode and may be in a state capable of listening to a sound signal [S301]. If the communication mode is entered, as mentioned in the foregoing description with reference to FIGS. 2A to 2C, an indicator indicating that the first terminal has entered the communication mode can be outputted through the first terminal. Moreover, the first terminal can output a notification information, which notifies neighbor terminals that the first terminal has entered the communication mode to be in the state capable of listening to the sound signal, through the audio output unit 152 [S302-1].

Thereafter, if a second terminal receives a user input of attempting to enable the second terminal to enter a communication mode, the second terminal enters the communication mode and may be in the state capable of listening to a sound signal [S303]. If the communication mode is entered, as mentioned in the foregoing description with reference to FIGS. 2A to 2C, the second terminal may output an indicator indicating that the communication mode has been entered or may broadcast a notification information through a sound signal [S304-1].

If the notification information is received from the second terminal, the first terminal can transmit an acknowledgement signal (ACK) in response to the notification information received through the sound signal [S303-2].

Thereafter, the first terminal can make a request for providing authentication information saved in the second terminal through a sound signal [S305].

When the notification information is broadcasted from the first terminal [S302-1], if the mode of the second terminal is set to the communication mode as well, the second terminal is able to transmit an acknowledgement signal (ACK) in response to the notification information received through the sound signal [S302-1]. If the acknowledgement signal is received, the first terminal may make a request for transmitting an authentication information to the second terminal [S305].

In response to the request made by the first terminal, the second terminal can transmit the authentication information to the first terminal through a sound signal [S306].

The embodiment shown in FIG. 3 is described in detail with reference to the accompanying drawings a follows.

FIG. 4 is a diagram of one example for a first terminal to receive a login information for accessing a web server from a second terminal. For clarity of distinction, a first terminal 400 includes a bar type terminal and a second terminal 450 includes a watch type terminal.

Referring to FIG. 4, in order to be provided with a service offered by a web server through the first terminal 400, a process for logging in to a web server should be accompanied. For instance, if the first terminal 400 attempts to access an email server, like the example shown in FIG. 4(a), a login page for inputting an email information and a password can be outputted through the first terminal 400.

While the login page is outputted, if a button 410 for setting a mode of the first terminal 400 to a communication mode is touched, the mode of the first terminal 400 can be set to the communication mode. According to the example shown in FIG. 4(b), the mode of the first terminal 400 is set to the communication mode by touching an execution button 410 outputted through a popup window 420 created after touching the authentication button 410 shown in FIG. 4(a).

The first terminal 400 may control a guide information, which guides a user input for setting a mode of the second terminal 450 to a communication mode, to be displayed through the popup window 420. According to the example shown in FIG. 4(b), an image is outputted to guide that a user input for setting the mode of the second terminal 450 to the communication mode is an input of touching a watch type terminal twice using two pointers.

Thereafter, if a user input of touching the second terminal 450 twice using two pointers is received, the mode of the second terminal 450 can be set to the communication mode. If the mode of the second terminal 450 is also set to the communication mode, the first terminal 400 can receive an authentication information from the second terminal 450.

In this case, an ID and password for logging in to a web server may be included in the authentication information. After the first terminal 400 has received the authentication information from the second terminal 450, like the example shown in FIG. 4(c), the first terminal 400 can make a request for logging in to the web server using the received authentication information.

Through the above-described embodiment, instead of inputting an ID and a password for logging in to a web server to the first terminal one by one, a user can log in to the web server by applying a simple touch input to each of the first terminal and the second terminal. Moreover, according to the above-described embodiment, since it is unnecessary for a user to memorize a login information for logging in to a web server all the time, user's convenience can be enhanced.

FIG. 5 is a diagram of one example for a first terminal to receive an authentication information for accessing an AP from a second terminal. For clarity of distinction, a first terminal 510 includes a tablet PC type terminal and a second terminal 520 includes a smartphone type terminal.

Referring to FIG. 5, in order to connect to an AP 500 through the first terminal 510, a following process should be accompanied. First of all, an SSID of the AP 500 to be connected is selected. Secondly, if a password is set for the AP 500, the corresponding password is inputted.

Yet, if the second terminal 520 is connected to the AP 500 in advance, the first terminal 510 receives an authentication information for accessing the AP 500 from the second terminal 520 and is then able to access the AP 500 using the received authentication information.

If a user input for setting a mode of the first terminal 510 to a communication mode is received, the first terminal 510 enters the communication mode and is then able to enter a state capable of listening to a sound signal outputted from the second terminal 520. In this case, the user input for setting the mode of the first terminal 510 to the communication mode may include one of various input examples such as an input of applying a preset touch input to the first terminal 510 (e.g., an input of touching the first terminal 510 twice using two pointers), an input of manipulating a button outputted through the first terminal 510, and the like [not shown in the drawing]. When the first terminal 510 enters the communication mode, if a Wi-Fi module of the first terminal 510 is in an off-state, the first terminal 510 may turn on the Wi-Fi module on entering the communication mode.

Like the example shown in FIG. 5, the first terminal 510 can control a guide information, which guides a user input for enabling the second terminal 520 to enter the communication mode, to be displayed. According to the example shown in FIG. 5, through a popup window, an image is outputted to guide that a user input for setting the mode of the second terminal 520 to the communication mode is an input of touching a watch type terminal twice using two pointers.

Thereafter, if a user input of touching the second terminal 520 twice using two pointers is received, the mode of the second terminal 520 can be set to the communication mode. If the mode of the second terminal 520 is also set to the communication mode, the first terminal 510 can receive an authentication information from the second terminal 520.

In this case, such information on the AP 500 as an SSID of the AP 500 currently accessed by the second terminal 520, a security authentication system of the AP 500, a password for accessing the AP 500 and the like can be included in the authentication information. After the first terminal 510 has received the authentication information from the second terminal 520, the first terminal 510 can make a request for an access to the AP 500 using the received information on the AP 500.

If both of the first terminal 510 and the second terminal access the same AP 500, they can communicate with each other via the AP 500.

According to the example shown in FIG. 5, a second terminal provides a first terminal with an information on an AP currently accessed by the second terminal. For another example, if an information on an AP intended to access by a first terminal is saved in a second terminal, the AP information may be provided to the first terminal no matter whether the second terminal currently accesses the AP. In this case, the second terminal may provide the first terminal with the information on the AP requested by the first terminal. Alternatively, the second terminal may provide the first terminal with an information on an AP most recently accessed by the second terminal or an information on an AP most frequently accessed by the second terminal.

For further example, if a second terminal fails to access an AP currently, as mentioned in the following description with reference to FIG. 6, a first terminal and the second terminal can transceive authentication information for a direct access to the second terminal with each other.

FIG. 6 is a diagram of one example for a first terminal to receive an authentication information for accessing a second terminal. For clarity of distinction, a first terminal 610 includes a tablet PC type terminal and a second terminal 620 includes a smartphone type terminal.

Referring to FIG. 6, if a user input for setting a mode of the first terminal 610 to a communication mode is received, the first terminal 610 enters the communication mode and is then able to enter a state capable of listening to a sound signal outputted from the second terminal 620.

When the first terminal 610 enters the communication mode, if a Wi-Fi module of the first terminal 610 is in off-state, the first terminal 610 may turn on the Wi-Fi module on entering the communication mode. Meanwhile, the user input for setting the mode of the first terminal 610 to the communication mode may include one of various input examples such as an input of applying a preset touch input to the first terminal 610 (e.g., an input of touching the first terminal 610 twice using two pointers), an input of manipulating a button outputted through the first terminal 610, and the like [not shown in the drawing]. When the first terminal 610 enters the communication mode, if a communication module (e.g., Bluetooth module, Wi-Fi Direct module, Wi-Fi, etc.) for a direct communication with the second terminal 620 is in an off-state, the first terminal 610 may turn on the communication module for the direct communication on entering the communication mode.

Like the example shown in FIG. 6, the first terminal 610 can control a guide information, which guides a user input for enabling the second terminal 620 to enter the communication mode, to be displayed. According to the example shown in FIG. 6, through a popup window, an image is outputted to guide that a user input for setting the mode of the second terminal 620 to the communication mode is an input of touching a watch type terminal twice using two pointers.

Thereafter, if a user input of touching the second terminal 620 twice using two pointers is received, the mode of the second terminal 620 can be set to the communication mode. If the mode of the second terminal 620 is also set to the communication mode, the first terminal 610 can receive an authentication information from the second terminal 620.

In this case, such information, which is required for the first terminal 610 to access the second terminal 620, as a name of the second terminal 620, a password for accessing the second terminal 620 and the like can be included in the authentication information. After the first terminal 610 has received the authentication information from the second terminal 620, the first terminal 610 can make a request for an access to the second terminal 620 using the received authentication information.

Like the example shown in FIG. 6, a user may be able to establish a connection (e.g., Bluetooth, Wi-Fi Direct, Hotspot, etc.) between the first terminal 610 and the second terminal 620 through a simple input.

According to the descriptions with reference to FIGS. 3 to 6, it is assumed that a first terminal can provide an authentication information through a sound wave or an ultrasonic wave from a second terminal. In doing so, in case of using a sound wave, although the sound wave has a relatively good refractive index to provide a good delivery power, it may cause a problem that the sound wave may interfere with surrounding noise. Hence, the second terminal can raise reliability of authentication information by simultaneously delivering the same information through a sound wave and an ultrasonic wave both. In addition, an authentication value (e.g., a parity code) is added to each of a signal delivered through a sound wave and a signal delivered through an ultrasonic wave and the two signals are then compared to each other, whereby reliability of the delivered information can be further raised.

For another instance, a second terminal repeatedly transmits authentication information plural times across a prescribed time, whereby reliability of the delivered information can be further raised.

Prior to communicating with a second terminal, a first terminal may obtain an identification information of the second terminal using a sound signal. A process for a first terminal to obtain an identification information of a second terminal from the second terminal is described in detail with reference to FIG. 7 as follows.

FIG. 7 is a diagram of one example for a first terminal to obtain an identification information of a second terminal from the second terminal.

Referring to FIG. 7, in case of attempting to share a file, like the example shown in FIG. 7(*a*), a first terminal 710 can control a setting screen, which is provided to set at least one of a file sharing target and a file sharing means, to be outputted. According to the example shown in FIG. 7(*a*), a first setting region I for remotely playing a file to share, a second setting region II for directly transmitting a file to share to a different terminal, and a third setting region III for selecting a medium for transmitting a file to be shared are included in the setting screen.

On the first setting region I for remotely playing a file to share, a list of devices capable of remotely playing a file to share by being connected to the first terminal 710 can be displayed. If a prescribed device is selected from the device list displayed on the first setting region I, the first terminal 710 can control the file, which is to be shared, to be remotely played in the selected device.

On the third setting region III for selecting a medium to transmit a file to share, a list of media for delivering a file to be shared can be displayed. If a prescribed medium is selected from the medium list displayed on the third setting region III, the first terminal 710 can control a file, which is to be shared, to be delivered through the selected medium. For instance, if an email item is selected from the third setting region III, the first terminal 710 may be able to control an email compose screen, to which a file to be shared is attached, to be outputted.

On the second setting region II, a list of devices capable of delivering a file to be shared can be displayed, According to the example shown in FIG. 7(a), since the first terminal 710 fails to discover a device capable of directly transmitting a file, no devices are displayed on the second setting region II. In doing so, if the second setting region II is touched, the first terminal 710 enters a communication mode and is then able to enter a state capable of listening to a sound signal.

As the second setting region II is touched, if the first terminal 710 enters the communication mode, like the example shown in FIG. 7(b), the first terminal 710 is able to receive an identification information of the second terminal 720 from the second terminal 720. In this case, the identification information of the second terminal 720 can include at least one of a name of the second terminal and an image representing the second terminal 720.

If the identification information of the second terminal 720 is received, like the example shown in FIG. 7(c), the first terminal 710 can control the identification information 730 of the second terminal 720 to be displayed on the second setting region II. According to the example shown in FIG. 7(c), an icon representing the second terminal 720 and a name (e.g., Chad's Phone) of the second terminal 720 is outputted.

Thereafter, if the identification information 730 of the second terminal 720 is touched, the first terminal 710 can transmit a file to share to the second terminal 720. In doing so, the file to be shared may be transmitted to the second terminal 720 by being carried on a sound signal or a communication channel (e.g., Bluetooth, Wi-Fi Direct, etc.) between the first terminal 710 and the second terminal 720.

In particular, in order to establish the communication channel (e.g., Bluetooth, Wi-Fi Direct, etc.) between the first terminal 710 and the second terminal 720, if the identification information of the second terminal 720 is touched, the first terminal 710 makes a request for an authentication information for establishing the communication channel (e.g., Bluetooth, Wi-Fi Direct, etc.) to the second terminal 720 and may be then able to be provided with the authentication information by the second terminal 720.

If a preset user input is received, a mobile terminal according to the present invention turns on a communication module and may be then able to access a preset external device. Simultaneously, the mobile terminal is controlled to enter a state capable of listening to a sound signal in response to the reception of the preset user input. Therefore, the mobile terminal can enter a state of capable of performing communications using both the sound signal and the communication module.

For instance, if a user input of tapping the display unit 151 twice using two pointers is received, the controller 180 activates a Wi-Fi module and is then able to attempt an access to an external device (e.g., a device having an SSID of the same name as the previously saved text string, a device having an SSID including the previously saved text string, a device having an SSID starting with the previously saved text string, etc.) corresponding to a previously saved text string. This is described in detail with reference to FIG. 8 as follows.

FIG. 8 is a diagram for one example of attempting an access to a preset external terminal if a communication module of a mobile terminal is turned on. For clarity of the following description, assume that a camera 810, an audio 820 and the like are outputting beacon signals around a mobile terminal 800.

If a Wi-Fi function is turned on in the camera 810 or the audio 820, the camera 810 or the audio 820 can broadcast a beacon frame including an SSID of its own to guide an access to the camera 810 or the audio 820. According to the example shown in FIG. 8, the SSID of the camera 810 is 'CAMERA-WIFI' and the SSID of the audio 820 is 'AUDIO-WIFI'.

Thereafter, if a preset user input is received by the mobile terminal 800, the controller 180 activates the Wi-Fi module and is then able to access an external device having an SSID including a previously saved text string. For instance, if the previously saved text string is 'CAMERA' the controller 180 can attempt the access to the SSID including the text string 'CAMERA'.

In FIG. 8, since the SSID of the camera 810 includes the text string 'CAMERA' the mobile terminal 180 may be able to automatically access the camera 810.

Once the mobile terminal 180 accesses the camera 810, the mobile terminal 800 may check a photo saved in the camera through an application or may be able to deliver a remote photographing command to the camera 810.

According to the example shown in FIG. 8, the mobile terminal 800 listens to the beacon signals broadcasted by the camera 810 and the audio and is then able to recognize the SSID of the camera 810 and the SSID of the audio 820. Unlike the example shown in the drawing, the mobile terminal 800 broadcasts a request signal (e.g., a probe request frame) for discovering the camera 810 or the audio 820 and may be then able to recognize the SSID of the camera 810 or the audio 820 through a response signal (e.g., a probe response frame) received in response to the request signal.

For another instance, the mobile terminal 800 may have recognized the SSID of the camera 810 or the audio 820 already through a different communication (e.g., Bluetooth, NFC, etc.).

Although FIG. 8 shows one example that the Wi-Fi module is activated in response to the preset user input, a prescribed communication module (e.g., a Bluetooth module) other than the Wi-Fi module may be activated. For instance, the controller 180 activates the Bluetooth module in response to a preset user input and may be then able to attempt an access to a device having a name including a previously saved text string. In doing so, the previously saved text string may be changed by a user.

If a preset user input is received, a mobile terminal according to the present invention turns on a communication module and may be then attempt an access to an external device found owing to the turned-on communication module. Simultaneously, the mobile terminal is controlled to enter a state capable of listening to a sound signal in response to the reception of the preset user input and may be then able to enter a state capable of performing a communication using both of the sound signal and the communication module.

For instance, if a user input of tapping the display unit 151 twice using two pointers is received, the controller 180 activates a Bluetooth module and is then able to attempt an access to a found external device. In doing so, if a plurality of external devices are found, the controller 180 may attempt the access to the external device determined as located closest to the mobile terminal among a plurality of the found external devices. This is described in detail with reference to FIG. 9 as follows.

FIG. 9 is a diagram for one example of attempting an access to an external terminal closest to a mobile terminal if a communication module of the mobile terminal is turned on. For clarity of the following description, assume that a headphone and an audio located around a mobile terminal are in Bluetooth communication available state.

Referring to FIG. 9, if a preset user input is received by a mobile terminal 900, the controller 180 activates a Bluetooth module and is then able to search for devices available for Bluetooth communication. If a plurality of devices available for Bluetooth communication are found, the controller 180 can attempt a pairing with the device located closest to the mobile terminal 900 among a plurality of the found devices. According to the example shown in FIG. 9, since a headset 910 is located closer than an audio 920, the controller 180 can attempt the pairing with the headset 910. In doing so, the controller 180 may determine a distance between the mobile terminal 900 and the corresponding external device based on the strength of a signal received from each of the headset 910 and the audio 920.

Although FIG. 9 shows one example that the Bluetooth module is activated in response to the preset user input, a communication module (e.g., a Wi-Fi module, etc.) other than the Bluetooth module may be activated. For instance, the controller 180 activates a Wi-Fi module in response to a preset user input and may be then able to attempt an access a device located closest to the mobile terminal 900 among the devices accessible through the Wi-Fi module.

If a preset user input is received, a mobile terminal according to the present invention turns on a plurality of communication modules and may be then able to display a communicable device list of communicable devices found through each of a plurality of the communication modules.

For instance, if a user input of tapping the display unit 151 twice using two pointers is received, the controller 180 activates a Wi-Fi module and a Bluetooth module and is then able to control a communicable device list to be displayed in a manner of gathering a list of devices accessible using the Wi-Fi module and a list of devices accessible using the Bluetooth module. This is described in detail with reference to FIG. 10 as follows.

FIG. 10 is a diagram for one example of outputting a device list of accessible devices found by each of a plurality of communication modules if a plurality of the communication modules are turned on. For clarity of the following description, assume that a Wi-Fi module and a Bluetooth module are activated in response to a preset user input.

Referring to FIG. 10(a), if a preset user input is received, the controller 180 can activate a Wi-Fi module and a Bluetooth module. Thereafter, if devices communicable devices communicable through the Wi-Fi module and devices communicable through the Bluetooth module are found, referring to FIG. 10(b), the controller 180 can control a found device list to be displayed.

If a prescribed device is selected from the device list, the controller 180 may be able to access the corresponding device through the communication module communicable with the corresponding device.

In doing so, if the number of the devices found through the Wi-Fi module and the Bluetooth module is considerable, it may cause inconvenience to a user in discovering an access-desired device from the device list at a glance. Hence, the controller 180 may be able to control only the devices containing a prescribed text string to be displayed on the device list among the devices found through the Wi-Fi module and the Bluetooth module.

For instance, assuming that a prescribed text string is 'LG' referring to FIG. 10(c), the controller 180 can control a device list, which is configured with a device having an SSID containing the text string 'LG' and a device having a device name including the text string 'LG' to be outputted. In this case, the prescribed text string may be changed by a user.

According to the example shown in FIG. 10, if a preset user input is received, communication modules of Wi-Fi, Bluetooth and the like are activated. The controller 180 can control a network service, which can be implemented in the mobile terminal, to be prepared or enter an executable state as soon as activates the communication modules of Wi-Fi, Bluetooth and the like. For instance, if a preset user input is received, the controller 180 turns on both a Wi-Fi module and a Bluetooth module and is also able to control a Wi-Fi Direct service (e.g., display (or miracast), play, send, print, etc.), Bluetooth A2DP, Bluetooth prescribed COD & DLNA service and the like to be prepared or enter an executable state. Through this, the controller 180 displays a service name, which is interactive with a corresponding device, on an accessible device list, thereby further enhancing user convenience.

While a device list is outputted, the controller 180 activates the microphone 121 so as to enable the microphone 121 to enter an external sound receivable state. In doing so, if a prescribed voice is inputted through the microphone 121, the controller 180 can control a device, which corresponds to the inputted voice, to be automatically connected.

For another instance, in response to a voice inputted while a device list is outputted, the controller 180 may run an application or search for a content corresponding to the inputted voice.

FIG. 11 is a diagram for one example of running a prescribed application through a voice inputted in the course of outputting a device list. If a voice is inputted through the microphone 121, the controller 180 can control an application, of which name corresponds to the inputted voice, to be run.

For instance, referring to FIG. 11, while a device list is outputted, if a voice 'Voice' is inputted from a user, the controller 180 can control a voice recognition secretary application to be run in response to the user input. According to the example shown in FIG. 11, for example, a word for running the voice recognition secretary application is 'Voice' by which the present invention is non-limited. A specific word other than the above-mentioned word can be assigned to run the voice recognition secretary application. Moreover, other applications can be activated by a voice as well as the voice recognition application.

FIG. 12 is a diagram for one example of outputting a search result of a content corresponding to an inputted voice. If a voice is inputted through the microphone 121, the controller 180 searches for a video in which an actor corresponding to the inputted voice appears, a song of a singer corresponding to the inputted voice, a multimedia file having a file name corresponding to the inputted voice, a multimedia file having a dialogue corresponding to the inputted voice, or a multimedia file having lyrics corresponding to the inputted voice and is then able to control a result of the search to be outputted.

For instance, referring to FIG. 12, if a voice To be or not to be is inputted, the controller 180 can control a result of a search for a content corresponding to the inputted voice to be outputted. For example, the controller 180 searches for a song including 'to be or not to be' as lyrics, a video including 'to be or not to be' as a dialogue and the like and may be then able to display a result of the search.

It will be appreciated by those skilled in the art that the present invention can be specified into other form(s) without departing from the spirit or scope of the inventions.

The above-described method (or operation flowchart) can be implemented in a program recorded medium as processor-readable codes. The processor-readable media may include all kinds of recording devices in which data readable by a processor are stored. The processor-readable media may include ROM, RAM, CD-ROM, magnetic tapes, floppy discs, optical data storage devices, and the like for example and also include carrier-wave type implementations (e.g., transmission via Internet).

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The present invention is applicable to electronic devices including microphones and speakers.

The invention claimed is:

1. A mobile terminal comprising:
a first wireless communication unit configured to perform a first wireless communication;
a display unit configured to display information;
a microphone configured to receive an input of a sound; and
a controller configured to control the microphone to enter a state capable of listening to a communication signal on at least one band of a sound wave or an ultrasonic wave and control the first wireless communication unit such that the first wireless communication unit is activated in response to receiving a preset user input.

2. The mobile terminal of claim 1, wherein if a device which supports the first wireless communication is searched, the controller is further configured to control the first wireless communication unit to attempt an access to the searched device.

3. The mobile terminal of claim 2, wherein if a plurality of devices which support the first wireless communication are searched, the controller is further configured to control the first wireless communication unit to attempt an access to a device closest to the mobile terminal among the plurality of the devices.

4. The mobile terminal of claim 2, wherein if a plurality of devices which support the first wireless communication are searched, the controller is further configured to control the first wireless communication unit to attempt an access to a device including a preset text string among the plurality of the devices.

5. The mobile terminal of claim 1, wherein the controller is further configured to control the first wireless communication unit to search for a device including a preset text string.

6. The mobile terminal of claim 1, further comprising a second wireless communication unit configured to perform a second wireless communication,
wherein the controller is further configured to control the second wireless communication unit such that the second wireless communication unit is activated together with the first wireless communication unit in response to receiving the preset user input.

7. The mobile terminal of claim 6, wherein the controller is further configured to control the display unit to display a communication list, and wherein a first device list of devices which support the first wireless communication unit and a second device list of devices which support the second wireless communication unit are integrated in the communication list.

8. The mobile terminal of claim 1, wherein the preset user input comprises a touch input of tapping the display unit plural times with a plurality of pointers.

9. A mobile terminal comprising:
a display unit configured to display information;
a microphone configured to receive an input of a sound; and
a controller configured to control the microphone to enter a state capable of listening to a communication signal on at least one band of a sound wave or an ultrasonic wave in response to receiving a preset user input,
wherein the controller further configured to access one of an external device or a web server through authentication information in response to receiving the communication signal including the authentication information via the microphone.

10. The mobile terminal of claim 9, wherein the authentication information includes one of an SSID (service set identifier) and a name of the external device or an ID (identifier) for logging in to the web server.

11. The mobile terminal of claim 9, further comprising an audio output unit configured to output the communication signal on the at least one band of the sound wave or the ultrasonic wave,
wherein the controller is further configured to control the audio output unit to output a first communication signal, for notifying that the mobile terminal is in a state capable of listening to the communication signal, in response to receiving the preset user input.

12. The mobile terminal of claim 11, wherein if an acknowledgement signal is received through the microphone in response to the first communication signal, the controller is further configured to control the audio output unit to output a second communication signal including authentication information.

13. The mobile terminal of claim 12, wherein the authentication information comprises information on an AP (access point) currently accessed by the mobile terminal.

14. The mobile terminal of claim 9, further comprising an audio output unit configured to output the communication signal on the at least one band of the sound wave or the ultrasonic wave,
wherein the controller is further configured to control the audio output unit to simultaneously output same information on both the sound wave band and the ultrasonic wave band.

15. The mobile terminal of claim 14, wherein the controller is further configured to control the audio output unit to output an authentication value for determining whether the information on each of the sound wave band and the ultrasonic wave band is distorted.

16. A method of controlling a mobile terminal, comprising:
- receiving an input of a preset user input; and
- setting a microphone of the mobile terminal to enter a state capable of listening to a communication signal on at least one band of a sound wave or an ultrasonic wave and controlling a wireless communication unit of the mobile terminal such that the wireless communication unit is activated in response to the received preset user input.

* * * * *